United States Patent
Ray

(10) Patent No.: US 12,477,988 B2
(45) Date of Patent: Nov. 25, 2025

(54) TREE VIBRATING DEVICE

(71) Applicant: Joseph Ray, Titusville, FL (US)

(72) Inventor: Joseph Ray, Titusville, FL (US)

(*) Notice: Subject to any disclaimer, the term of this patent is extended or adjusted under 35 U.S.C. 154(b) by 766 days.

(21) Appl. No.: 17/699,591

(22) Filed: Mar. 21, 2022

(65) Prior Publication Data

US 2023/0180664 A1 Jun. 15, 2023

Related U.S. Application Data

(60) Provisional application No. 63/361,258, filed on Dec. 10, 2021.

(51) Int. Cl.
*A01D 46/26* (2006.01)

(52) U.S. Cl.
CPC ........ *A01D 46/26* (2013.01); *A01D 2046/266* (2013.01)

(58) Field of Classification Search
CPC ........ A01D 46/00–46/30; A01D 46/26; A01D 2046/262; A01D 46/264; A01D 2046/266; A01D 2046/268
See application file for complete search history.

(56) References Cited

U.S. PATENT DOCUMENTS

| | | | | |
|---|---|---|---|---|
| 2,656,669 A | * | 10/1953 | Avansino | A01D 46/26 74/54 |
| 3,137,116 A | * | 6/1964 | Besser | A01D 46/26 74/44 |
| 3,362,145 A | * | 1/1968 | Steingas | A01D 46/26 56/328.1 |
| 3,486,316 A | * | 12/1969 | Gaul | A01D 46/26 56/329 |
| 3,729,906 A | * | 5/1973 | Coblentz | A01D 46/26 47/42 |
| 2016/0095278 A1 | * | 4/2016 | Slater | A01D 51/00 56/327.1 |
| 2017/0344238 A1 | * | 11/2017 | Nielsen | A01D 46/26 |

FOREIGN PATENT DOCUMENTS

| | | | | |
|---|---|---|---|---|
| CN | 103039199 A | * | 4/2013 | |
| CN | 206118632 U | * | 4/2017 | |
| CN | 109005916 A | * | 12/2018 | ........... A01D 46/264 |
| CN | 109463126 A | * | 3/2019 | ............. A01D 46/26 |
| CN | 110574552 A | * | 12/2019 | |
| CN | 209710758 U | * | 12/2019 | |

(Continued)

*Primary Examiner* — Joseph M Rocca
*Assistant Examiner* — Madeline I Runco
(74) *Attorney, Agent, or Firm* — Brennan, Manna & Diamond, LLC

(57) ABSTRACT

A leaf shaking device primarily comprised of at least one control unit, at least one cable, and at least one clamp. The control unit is further comprised of a motor with a plurality of vibration levels. The cable further connects to the control unit, wherein the clamp is located at the end of the cable that is not connected to the control unit. The clamp can then be secured around the limbs or trunk of a tree and the motor can be activated such that the tree begins to vibrate. As a result, all leaves on the tree or on the limb of the tree that the clamp is attached to will fall of the tree. The vibration of the motor can further be programmed to run for a fixed period of time such that the device can be left unattended while running.

5 Claims, 3 Drawing Sheets

(56) References Cited

FOREIGN PATENT DOCUMENTS

| | | | | |
|---|---|---|---|---|
| CN | 209949893 | U | * | 1/2020 |
| FR | 2183544 | A1 | * | 12/1973 |
| FR | 2235641 | A1 | * | 1/1975 |
| FR | 2446057 | A1 | * | 8/1980 |
| FR | 2512322 | A1 | * | 3/1983 |
| GH | 428304 | A | * | 1/1967 |
| RO | 128353 | B1 | * | 9/2019 |
| WO | WO-2018131015 | A2 | * | 7/2018 ............. A01D 46/26 |

* cited by examiner

TREE VIBRATING DEVICE

CROSS-REFERENCE TO RELATED APPLICATION

The present application claims priority to, and the benefit of, U.S. Provisional Application No. 63/361,258, which was filed on Dec. 10, 2021, and is incorporated herein by reference in its entirety.

FIELD OF THE INVENTION

The present invention relates generally to the field of trees. More specifically, the present invention relates to a leaf shaking device primarily comprised of at least one control unit, at least one cable, and at least one clamp. The control unit is further comprised of a motor with a plurality of vibration levels. The cable further connects to the control unit, wherein the clamp is located at the end of the cable that is not connected to the control unit. The clamp can then be secured around the limbs or trunk of a tree and the motor can be activated such that the tree begins to vibrate. As a result, all leaves on the tree or on the limb of the tree that the clamp is attached to will fall of the tree. The vibration of the motor can further be programmed to run for a fixed period of time such that the device can be left unattended while running. Accordingly, the present disclosure makes specific reference thereto. Nonetheless, it is to be appreciated that aspects of the present invention are also equally applicable to other like applications, devices and methods of manufacture.

BACKGROUND

For deciduous trees, collecting and discarding leaves during the fall season is very common and necessary in residential and commercial communities alike to preserve grass and prevent mold or fungus from developing under the leaves as they sit on the grass. If the wind is blowing when leaves are falling, the leaves also become scattered across a lawn or other area, which makes collecting said leaves difficult. As a result, raking, gathering, and discarding leaves can become a major task. Depending on the size of the area and the amount of leaves that have fallen in said area, it may take considerable effort to rake the leaves into piles and then place the leaves into bags or containers. This process can be extremely physically demanding, even more so to an individual who suffers backaches, arthritis, heart trouble or other physical ailments.

Therefore, there exists a long-felt need in the art for a device that allows a user to more easily collect leaves. There also exists a long-felt need in the art for a leaf shaking device that can be attached to a tree, wherein the device vibrates the tree and causes the leaves of the tree to fall below the tree. Further, there exists a long-felt need in the art for a leaf shaking device that can be attached to a tree, wherein the device vibrates the tree and causes the leaves of the tree to fall below the tree and wherein the device does not damage the trunk or limbs of the tree.

The subject matter disclosed and claimed herein, in one embodiment thereof, comprises a leaf shaking device. The device is primarily comprised of at least one control unit, at least one cable, and at least one clamp. The control unit is further comprised of a motor with a plurality of vibration levels. The cable further connects to the control unit, wherein the clamp is located at the end of the cable that is not connected to the control unit. The clamp can then be secured around the limbs or trunk of a tree and the motor can be activated such that the tree begins to vibrate. As a result, all leaves on the tree or on the limb of the tree that the clamp is attached to will fall of the tree. The vibration of the motor can further be programmed to run for a fixed period of time such that the device can be left unattended while running.

In this manner, the leaf shaking device of the present invention accomplishes all of the forgoing objectives and provides a device that allows a user to more easily collect leaves by vibrating the tree and causing the leaves of the tree to fall below the tree. Further, the device does not damage the trunk or limbs of the tree while doing so. As a result, the leaf shaking device overcomes the inefficiencies of existing methods of collecting leaves known in the art.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a leaf shaking device. The device is primarily comprised of at least one control unit, at least one cable, and at least one clamp. The body of the control unit is preferably rectangular in shape and is made of a durable metal such as, but not limited to stainless steel or aluminum. The body is also comprised of at least one wheel that may be fixedly or removably attached to the body. In addition, the body may be comprised of at least one handle that allows the control unit to be easily pulled/transported and at least one tow hitch that allows the control unit to be easily attached to and towed by a vehicle, ATV, UTV, or another wheeled device of the like. The control unit is further comprised of at least one cable that is fixedly or removably attached to any portion of the body of the control unit, wherein the cable is further connected to at least one motor and is in electrical communication with the motor via at least one internal wire. The control unit is also comprised of a motor that may be gas-powered or powered by at least one battery in differing embodiments. The control unit also has at least one button and at least one display screen.

Each cable is further comprised of at least one clamp that is fixedly or removably attached to each cable at the portion of the cable that is not attached to the control unit. The clamp is preferably comprised of a generally C-shaped body of any size that is further comprised of a first curved member and a second curved member that are connected by at least one hinge. The interior surface of each member may further be comprised of a rubber padding. The clamp can be closed around a limb or a trunk of a tree, wherein the padding contacts but does not damage the limb or trunk. In one embodiment, the exterior surface of both members may further be comprised of at least one fastener that allows both members to be locked around a limb or trunk.

The device can further be attached to a tree in order to remove the leaves from said tree using vibration. To accomplish this, the clamp can first be attached around a trunk or a limb of a tree. Then, the at least one button can be used to turn on the control unit. The motor of the control unit has a plurality of vibration levels that can be selected, increased, and/or decreased by pressing at least one button and/or the display screen. The display screen also displays the various vibration level options. The button and/or screen is further in electrical communication with at least one processor that is in turn in electrical communication with the motor. In this manner, the motor can be controlled by the button and/or screen.

Each vibration level of the motor causes the clamp and/or cable to vibrate. As a result, the clamp vibrates the portion of the tree it is attached to. This causes the leaves in said area of the tree to fall off the tree. The button may also allow a user to program the motor to only vibrate for a fixed period of time (e.g., 15 minutes, 30 minutes, 1 hour, etc.) wherein the motor then automatically shuts off after said period of time has passed. In this manner, the device can be safely left unattended while the clamps are attached to a tree and the device is running.

Accordingly, the leaf shaking device of the present invention is particularly advantageous as it allows a user to more easily collect leaves by vibrating the tree and causing the leaves of the tree to fall below the tree. Further, the device does not damage the trunk or limbs of the tree while doing so. In this manner, the leaf shaking device overcomes the inefficiencies of existing methods of collecting leaves known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
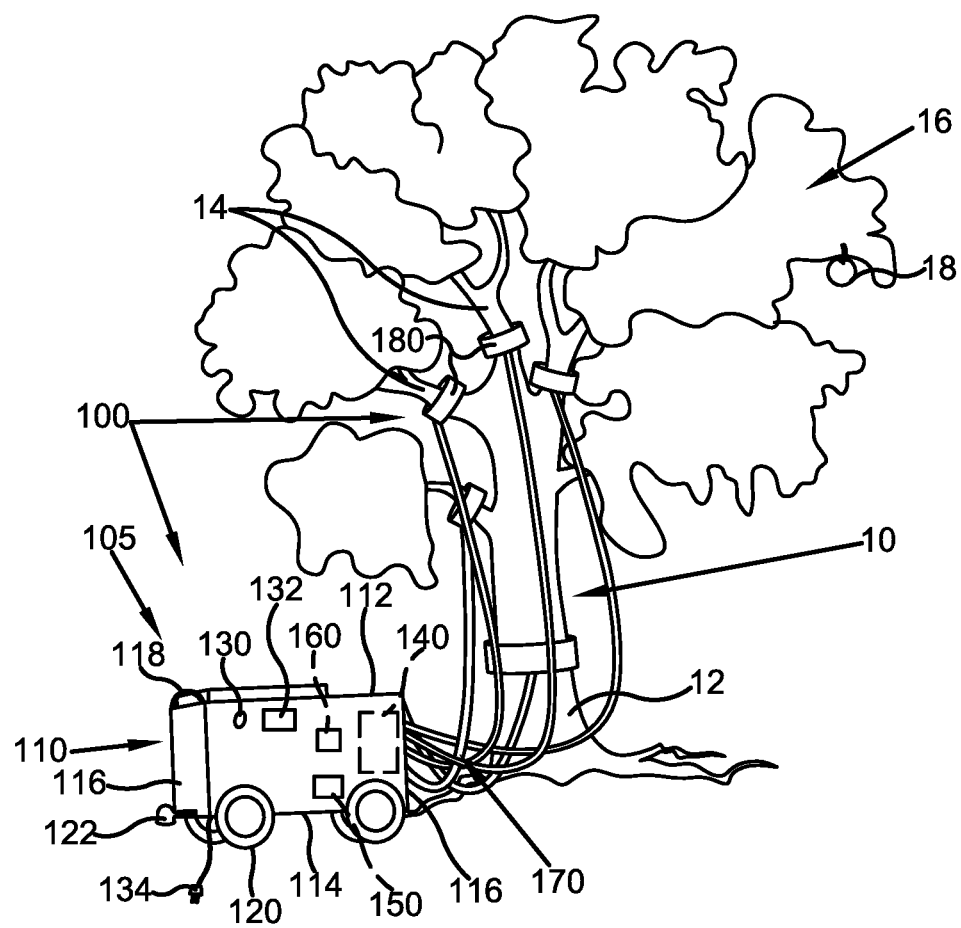
FIG. 1 illustrates a perspective view of one potential embodiment of a leaf shaking device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that allows a user to more easily collect leaves. There also exists a long-felt need in the art for a leaf shaking device that can be attached to a tree, wherein the device vibrates the tree and causes the leaves of the tree to fall below the tree. Further, there exists a long-felt need in the art for a leaf shaking device that can be attached to a tree, wherein the device vibrates the tree and causes the leaves of the tree to fall below the tree and wherein the device does not damage the trunk or limbs of the tree.

The present invention, in one exemplary embodiment, is comprised of a leaf shaking device. The device is primarily comprised of at least one control unit, at least one cable, and at least one clamp. The control unit is further comprised of a motor with a plurality of vibration levels, wherein the cable further connects to the control unit. The clamp is further located at the end of the cable that is not connected to the control unit and can be secured around the limbs or trunk of a tree and the motor can be activated such that the tree begins to vibrate. As a result, all leaves on the tree or on the limb of the tree that the clamp is attached to will fall of the tree. The vibration of the motor can further be programmed to run for a fixed period of time such that the device can be left unattended while running.

Referring initially to the drawings, FIG. 1 illustrates a perspective view of one potential embodiment of a leaf shaking device 100 of the present invention in accordance with the disclosed architecture. The device 100 is primarily comprised of at least one control unit 105, at least one cable 170, and at least one clamp 180. The body 110 of the control unit 105 is preferably rectangular in shape and is made of a durable metal such as, but not limited to stainless steel or aluminum. The body 110 further has a top surface 112 and generally parallel bottom surface 114, and at least one pair of generally parallel side surfaces 116. However, in differing embodiments the body 110 may be any shape known in the art such as, but not limited to: square, circular, triangular, etc. The body 110 is further comprised of at least one wheel 120 that may be fixedly or removably attached to the body 110. In addition, the body 110 may also be comprised of at least one handle 118 that allows the control unit 105 to be easily pulled/transported. In one embodiment, the body 110 may be comprised of at least one tow hitch 122 that allows the control unit 105 to be easily attached to and towed by a vehicle, ATV, UTV, or another wheeled device of the like.

The control unit 105 is further comprised of at least one cable 170. The cable 170 may be manufactured from any material known in the art but is preferably manufactured from a rubber or metal material. In differing embodiments, each cable 170 may be of a fixed length or may have be telescopic and have an adjustable length. The cable 170 may further fixedly or removably attach to any portion of the body 110 of the control unit 105, wherein the cable 170 is further connected to at least one motor 140 and is in electrical communication with the motor 140 via at least one internal wire 172.

Figure 2:
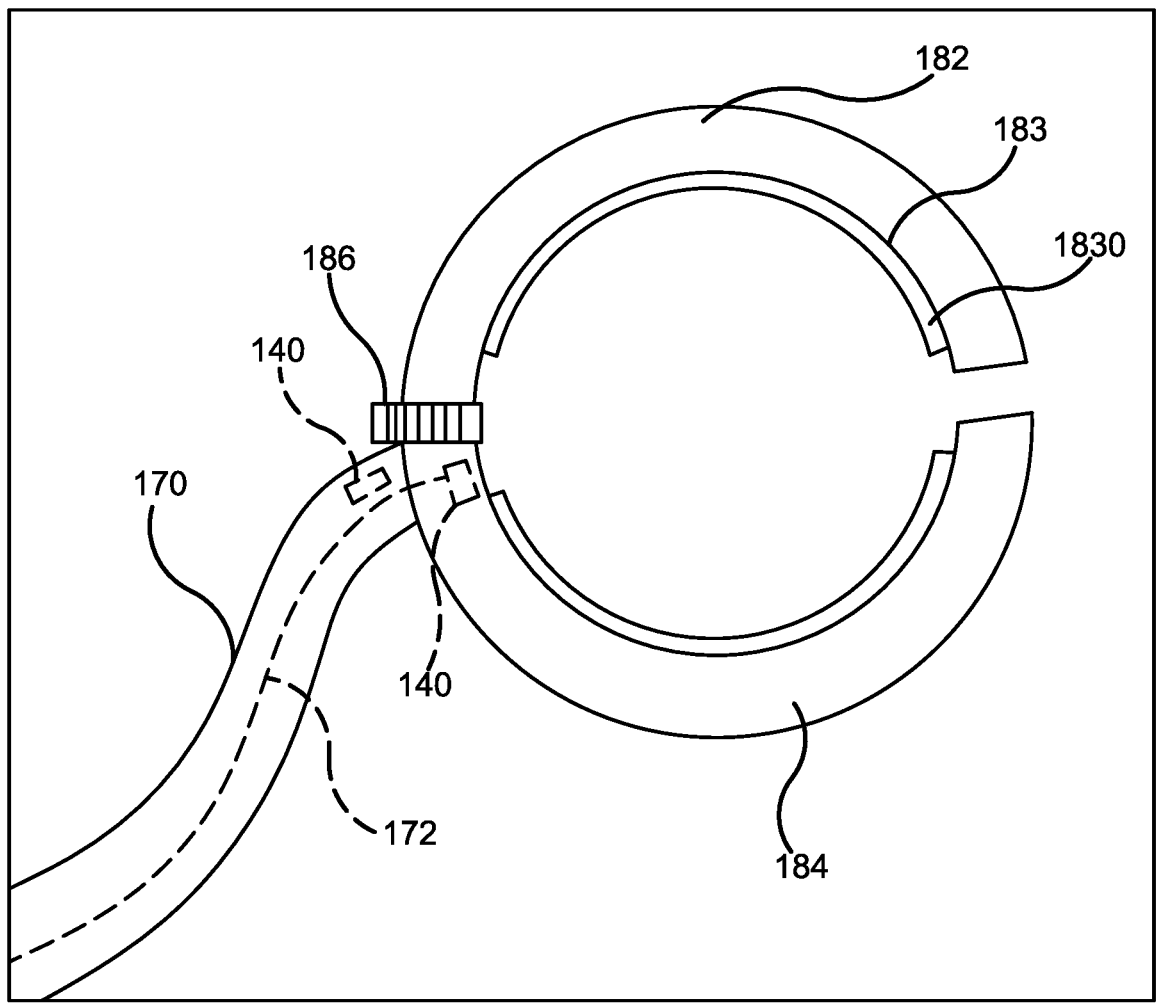
FIG. 2 illustrates a side view of a clamp one potential embodiment of a leaf shaking device of the present invention in an open position in accordance with the disclosed architecture.
Figure 3:
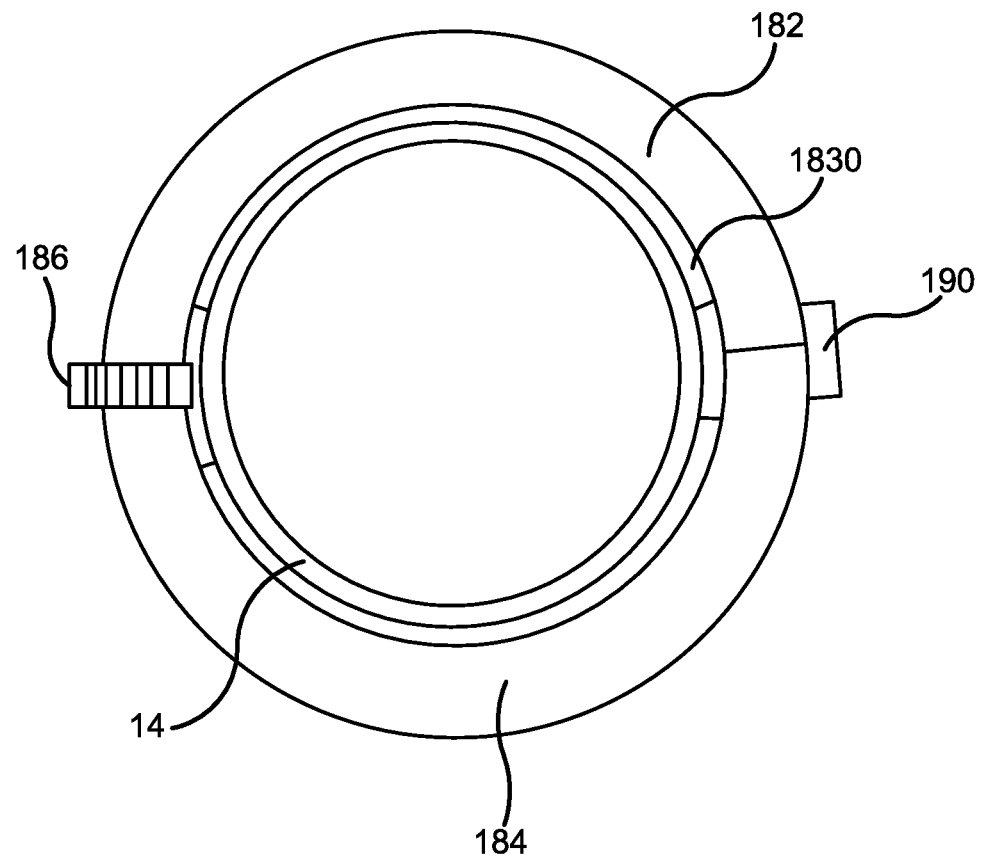
FIG. 3 illustrates a cross-sectional view of a clamp one potential embodiment of a leaf shaking device of the present invention in a closed position in accordance with the disclosed architecture.

FIG. 2 illustrates a side view of a clamp one potential embodiment of a leaf shaking device 100 of the present invention in an open position in accordance with the disclosed architecture. Each cable 170 is further comprised of at least one clamp 180 that is fixedly or removably attached to each cable 170 at the portion of the cable 170 that is not attached to the control unit 105. The clamp 180 is preferably comprised of a generally C-shaped body of any size that is further comprised of a first curved member 182 and a second curved member 184 that are connected by at least one hinge 186. In differing embodiments, the hinge 186 may be any hinge-type known in the art such as, but not limited to: an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, etc. The interior surface 183 of each member 182, 184 may further be comprised of a rubber padding 1830. As best seen in FIG. 3 and FIG. 1, the clamp 180 can be closed and secured around a limb 14 or a trunk 12 of a tree 10, wherein the padding 1830 contacts but does not damage the limb 14 or trunk 12. In one embodiment, the exterior surface 185 of both members 182, 184 may further be comprised of at least one fastener 190 that allows both members 182, 184 to be locked around a limb 14 or trunk 12. Said fastener 190 may be any fastener known in the art such as, but not limited to: a clasp, a magnetic fastener, a bolt, a screw, a latch, etc. It is contemplated that in the preferred embodiment, the device 100 has at least one clamp 180 that can be attached around a trunk 12 of a tree and at least one clamp 180 that attaches around a limb 14 of a tree 10, wherein both clamps 180 can be used simultaneously. However, the number of clamps 180 can vary in differing embodiments. For example, in one embodiment the device 100 may only have at least one clamp 180 that attaches around a trunk 12, or at least one clamp 180 that attaches around a limb 14.

The control unit 105 is further comprised of a motor 140 that can be gas-powered or powered by at least one battery 150 in differing embodiments. The battery 150 may be a disposable battery 150 or a rechargeable battery 150 in the form of an alkaline, nickel-cadmium, nickel-metal hydride battery 170, etc. such as any 3V-12 volts DC battery 150 or other conventional battery 150 such as A, AA, AAA, etc. that supply power to the device 100. Throughout this specification the terms "battery" and "batteries" may be used interchangeably to refer to one or more wet or dry cells or batteries 150 of cells in which chemical energy is converted into electricity and used as a source of DC power. References to recharging or replacing batteries 150 may refer to recharging or replacing individual cells, individual batteries 150 of cells, or a package of multiple battery cells as is appropriate for any given battery 150 technology that may be used. Additionally, the battery 150 may be recharged by a power cord 134 that can be plugged into a 110V/240V outlet or other power outlet of the like. The control unit 105 is also comprised of at least one button 130 and at least one display screen 132. The screen 132 may be any screen-type known in the art such as, but not limited to: a touch screen, an LCD screen, an OLED screen, an ELD screen, an LED backlit LCD screen, an LED screen, a PDP screen, etc.

The device 100 can further be attached to a tree 10 in order to remove the leaves 16 from said tree 10 using vibration. To do so, the clamp 180 can first be attached (and in an embodiment of the device 100 with a fastener 190, locked) around a trunk 12 or a limb 14 of a tree 10. Then, the at least one button 130 can be used to turn on the control unit 105. The motor 140 of the control unit 105 has a plurality of vibration levels that can be selected, increased, and/or decreased by pressing at least one button 130 and/or the display screen 132, wherein the display screen 132 also displays the various vibration level options. The button 130 and/or screen 132 is further in electrical communication with at least one processor 160 that is in turn in electrical communication with the motor 140. In this manner, the motor 140 can be controlled by the button 130 and/or screen 132.

The motor 140 may have any number of vibration levels, wherein each level causes the clamp 180 and/or cable 170 to vibrate. As a result, the clamp 180 vibrates the portion of the tree 10 it is attached to, which in turn causes the leaves 16 in said area of the tree 10 to fall off the tree 10. However, in one embodiment of the device 100 the clamp 180 and cable 170 are also each comprised of at least one vibrating motor 140 that can be controlled by the button 130 of the control unit 105. In an embodiment of the device 100 which has a motor 140 within the clamp 180, the motor 140 is in electrical communication with the motor 140 of the control unit 105 via the wiring 172 such that a user can open and close the clamp 180 via pressing the button 130. The button 130 may also allow a user to program the motor 140 to only vibrate for a fixed period of time (ex. 15 minutes, 30 minutes, 1 hour, etc.) wherein the motor 140 then automatically shuts off after said period of time has passed. In this manner, the device 100 can be safely left unattended while the clamps 180 are attached to a tree 10 and the device 100 is running. Further, the device 100 allows all leaves 16 from a tree 10 to be removed at one time such that the leaves 16 collect and can then be easily raked from the area below the tree 10.

It should be appreciated that the device 100 can not only be used to remove leaves 16 from a tree 10, but can also be used to remove fruits 18 or other desirable agricultural or food products of the like via the same vibrations. In this manner, the device 100 can also be used in a wide variety of agricultural settings to harvest various fruits 18, nuts, berries, agricultural products etc. that hang from a tree 10 and or bush.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "leaf shaking device" and "device" are interchangeable and refer to the leaf shaking device 100 of the present invention.

Notwithstanding the forgoing, the leaf shaking device 100 of the present invention and its various components can be of any suitable size and configuration as is known in the art without affecting the overall concept of the invention, provided that they accomplish the above-stated objectives. One of ordinary skill in the art will appreciate that the size, configuration and material of the leaf shaking device 100 as shown in the FIGS. are for illustrative purposes only, and that many other sizes and shapes of the leaf shaking device 100 are well within the scope of the present disclosure. Although the dimensions of the leaf shaking device 100 are important design parameters for user convenience, the leaf shaking device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A leaf shaking device comprising:
   a control unit further having a button, a display, a wheel, a power cord, a battery and a motor;
   a cable electrically connected to the control unit and the motor via an internal wire;
   a clamp connected to the cable, wherein the clamp is sized and configured to be positioned around a tree branch; and
   wherein the clamp comprises a first curved member, a hinge, a second curved member, and a clamp motor housed within the clamp in electrical communication with the motor of the control unit and configured to open and close the clamp via the button.

2. The leaf shaking device of claim 1, wherein the clamp is generally C-shaped.

3. The leaf shaking device of claim 2, wherein the motor comprises a plurality of vibration levels that can be used to vibrate the clamp at a desired level.

4. The leaf shaking device of claim 3, wherein the plurality of vibration levels can be controlled and programmed to run on a timer or via the button.

5. The leaf shaking device of claim 1, wherein the control unit is further comprised of a handle.

* * * * *